Mar. 6, 1923.
J. T. LANDIS ET AL.
DEMOUNTABLE RIM.
FILED JULY 25, 1919.
1,447,311.
3 SHEETS—SHEET 1.
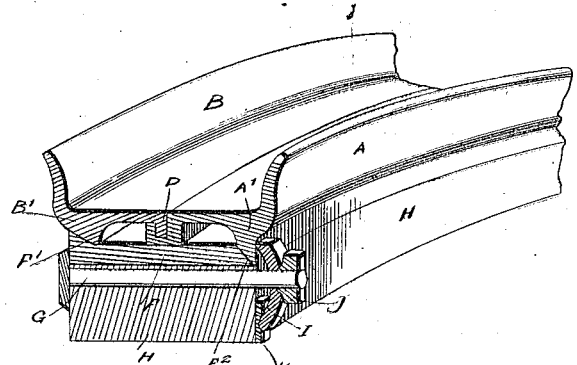
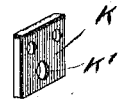
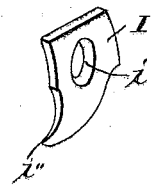
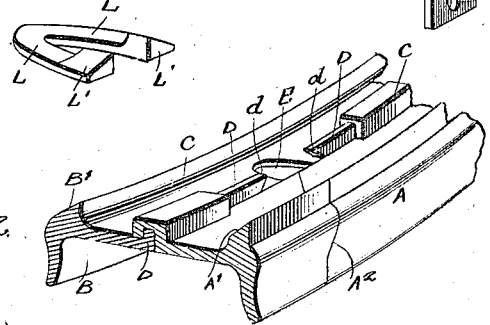
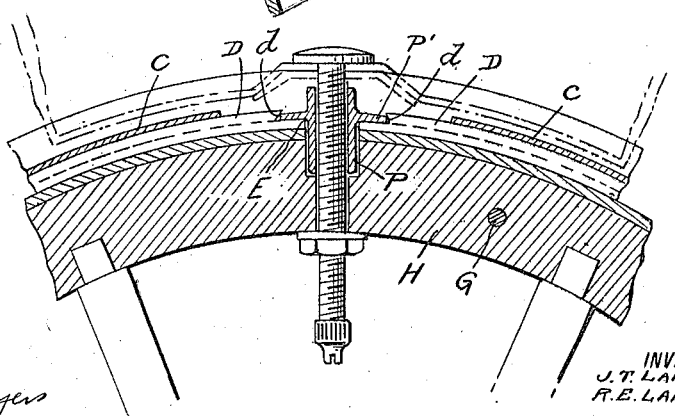
WITNESSES
INVENTOR
J. T. LANDIS,
R. E. LANDIS,
BY
ATTORNEYS Mar. 6, 1923.
J. T. LANDIS ET AL.
DEMOUNTABLE RIM.
FILED JULY 25, 1919.
1,447,311.
3 SHEETS—SHEET 2.
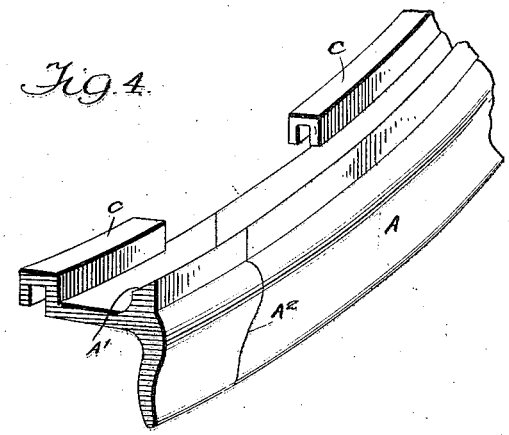
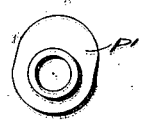
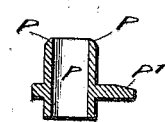
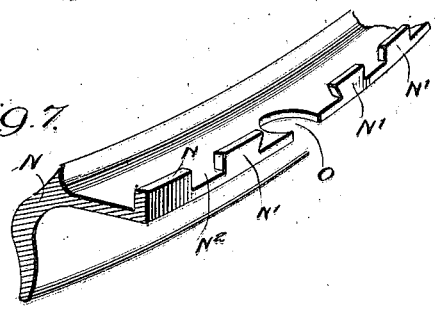
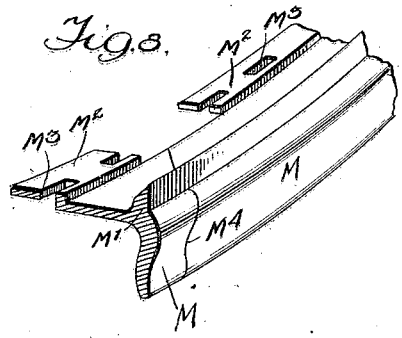
WITNESSES
INVENTOR
J. T. LANDIS,
R. B. LANDIS,
BY
ATTORNEYS Mar. 6, 1923.
J. T. LANDIS ET AL.
DEMOUNTABLE RIM.
FILED JULY 25, 1919.
1,447,311.
3 SHEETS—SHEET 3.
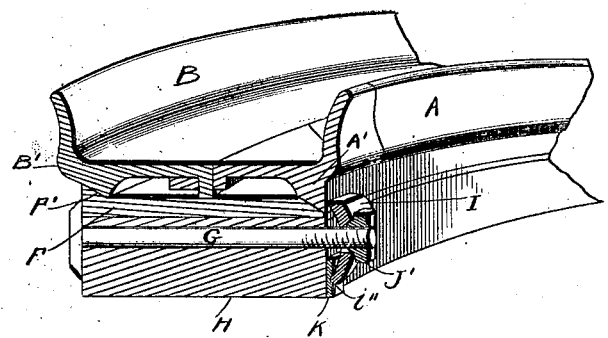
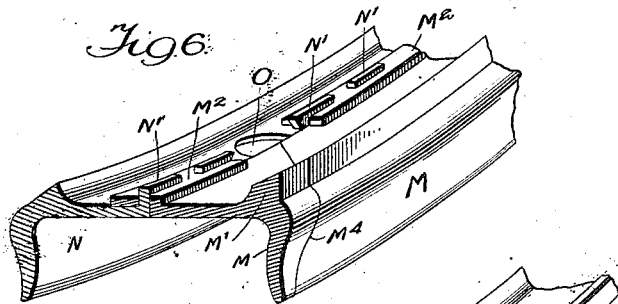
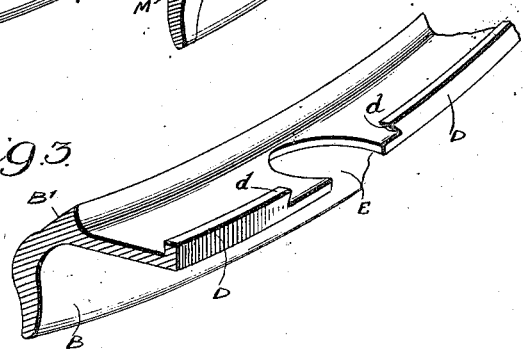
WITNESSES
INVENTOR
J. T. LANDIS,
R. E. LANDIS,
BY
ATTORNEYS Patented Mar. 6, 1923.

1,447,311

UNITED STATES PATENT OFFICE.

JOHN TANNEHILL LANDIS AND ROBERT EDWARD LANDIS, OF NASHVILLE, TENNESSEE.

DEMOUNTABLE RIM.

Application filed July 25, 1919. Serial No. 313,157.

*To all whom it may concern:*

Be it known that we, JOHN T. LANDIS and ROBERT E. LANDIS, citizens of the United States, and residents of Nashville, in the county of Davidson and State of Tennessee, have invented a new and useful Improvement in Demountable Rims, of which the following is a specification.

Our invention relates to improvements in vehicle wheel rims and more particularly to rims of the sectional or separable channel type, and demountable rims, such as are now commonly used with pneumatic tires.

An object of our invention is to provide a demountable rim of two sections, each section having its tire bead retainer or flange integral therewith.

Another object is to provide a separable demountable rim the point of separation of which is longitudinally or circumferentially of the rim base portion, with either base portion of the tire resting on its corresponding portion of the separable rim.

Another object is to produce a demountable rim that may be readily withdrawn from tires, especially heavy tires, in separate parts.

With these and other objects in view our invention consists in certain novel features of construction, arrangement and combination of parts, as will be hereinafter fully described and pointed out in the claims, reference being had to the accompanying drawings, in which Figure 1 is a fragmentary sectional perspective view of one form of the invention as applied to a wheel felly;

Figure 2 is an inverted view of such device shown in perspective, partly in section, detached from the felly;

Figure 3 is a sectional inverted perspective view of a fragment of one of the separable sections;

Figure 4 is a similar view of the other or complementary section;

Figure 5 is a perspective view partly in section showing a modified form of demountable rim;

Figure 6 is a sectional view showing the inner face of this modified form;

Figure 7 is a sectional view;

Figure 8 is a similar view of the other or complementary member;

Figure 9 is a perspective view of a supplemental means for fastening the locking members together;

Figure 10 is a top plan view of another locking means;

Figure 11 is a longitudinal section of the locking means;

Figures 12 and 13 are perspective views of parts of the means for retaining the demountable rim on the felly band.

Figure 14 is a detail sectional view through the rim applied, the view illustrating the locking means for the same.

Referring more specifically to the drawing and to the form illustrated in Figures 1, 2, 3, and 4, it will be seen that we provide a demountable rim composed of two sections divided longitudinally and tapering inwardly transversely to their meeting edges. These sections or members which are outer and inner sections are designated as A and B, respectively. The sections A and B are provided with the usual tire bead engaging flanges and the section A is formed with a flange A' the inner face of which is beveled for engaging the adjacent edge of the felly band F.

The outer section is split diagonally as at $A^2$ and is provided with a channeled or grooved rib C, integral with said split rim section on its inner face. The other member or section of the rim is provided with flange or tongue portion D projecting radially inwardly and adapted to fit within said grooved rib C.

The rib of the split section may be circumferentially continuous, or it may exist only at intervals around the inner face of the rim, and likewise the flange or tongue D may be continuous or exist only at intervals; but preferably they are both continuous around the inner rim diameters except at the portion shown as cut away in Figures 2, 3, and 4.

In the section B an open slot E is provided to receive a tire valve stem (not shown).

This slot E is shown as positioned opposite the diagonal split $A^2$ in the section A, but the split section may, if desired, be positioned circumferentially independent relatively of the other section B which carries this slot.

The felly band F which may be conventional has the inclined portion $F^1$ to receive the wedge base $B^1$ of the member B and the inclined portion $F^2$ to receive the wedge base $A^1$ of the member A.

The means to hold the sectional rim on the felly band consists of bolts G passing through the felly H, pivot washers I and ball nuts J; the pivotal end $i''$ of the washers I is seated in a socket $K'$ in the plates K secured to the outside face of the felly. The upper end of the pivot washer bears against the wedge base $A^1$ when the parts are assembled and placed on the wheel.

A traction stud (not shown) is designed to be mounted in the felly band to prevent rim creeping longitudinally and to be placed between the legs of key L, but it may be placed at any other opening in the groove rib and tongue at any other place.

At the opposing ends $d$ of the tongue D adjacent the valve stem slot, these ends are undercut or beveled inwardly and between these undercut ends is forced a locking wedge which is a substantially U-shaped key comprising the legs L and the enlarged wedge shaped feet or ends $L'$, the upper faces being reversely beveled to correspond to the bevel of the undercut ends $d$ of the tongue D. This key straddles the valve stem (not shown), and has its flat face lying against the inner faces of the rim sections.

In operation the sections of rim are applied to the tire case and assembled by inserting the solid section base B within the tire with the valve stem of the tire tube resting in the opening E. The split section A is then compressed to a sufficiently small diameter so that on being applied from the opposite side of the tire, the locking member C in Figures 1, 2 and 4 or slotted lip $M^2$ in Figures 6 and 8, engages with the corresponding locking member D or $N'$ on the other or solid base section. Upon engagement of the members, the split section, by reason of its resiliency is expanded to a position of inter-locking envelopment of the corresponding members all around its inner diameter. Inflation of the tire causes the split section to seat firmly under the base of the outer tire bead. Likewise, the effect of the air pressure on the walls of the tire causes the beads to spread firmly against the retaining flanges, and thus securely hold the rim interlocking members together. The insertion of the locking key now adds to security.

The rim is then placed on the felly band and the pivot plates put on the bolts and positioned with the upper end bearing against the outside of wedge base $A^1$ and the ball nuts then turned up tight forcing the demountable rim into place and securely holding it there. The inflated tire showing a wider transverse base forces the sections of the rim outwardly and thus adds to the grip or interlocking relation of the tongue and grooved rib.

In the modified form shown in Figures 5 to 9, the outer section M has a diagonal slit $M^4$, the wedge base $M^1$ and is provided at its inner edge with a lip $M^2$ having a series of open spaces $M^3$ longitudinally positioned around the circumference of said lip, while the inner section or member N of the rim is provided with a corresponding series of inwardly projecting radial tongues or lugs $N^1$ with spaces $N^2$ between the same. The member N also has an open slot O to receive the valve stem of a tire valve (not shown). Opposing ends of the tongues $N^1$ on opposite sides of the valve stem slot O are undercut or beveled as in form hereinbefore described, and for the same purpose, namely to receive the locking key or means.

To assemble this form tongues or lugs $N^1$ are passed through the openings $M^3$, with the openings O opposite the slit $M^4$, and the expansible key hereinbefore described is then forced into place, and the rim is then to be properly applied to the felly band.

In Figures 10 and 11 I have shown a modified form of latch for locking the rim sections together which as will be noted consists of a tubular body P, which is a combination of valve stem sleeve (or bushing), driving stud and rim latch. In operation this sleeve is slipped on the valve stem projecting through the valve stem slot in the rim with the tapered end $p$ projecting radially inwardly. The opposite end of the sleeve is designed to enter the usual valve stem slot until the cam rib $P'$ seats on the inner face of the rim; the sleeve is then rotated to bring the beveled cam nose of the rib athwart the joint between the rim sections. In this position the tapered edge of the cam interlocks with the undercuts and the tongues in each form of rim. The tapered end $p$ projects into a registering hole (not shown), provided in the felly band and thus acts as a driving stud to prevent creeping of the rim on the wheel.

From the above it will be understood that we provide a cheap and efficient demountable rim that is readily assembled and taken apart, is simple in construction and positive in action, and which can be quickly applied and removed from a tire.

We claim:—

1. A rim comprising a pair of annular sections, one of which is continuous and the other being split, one section being provided at its outer edge with a laterally projecting grooved rib and the other being provided with an inwardly directed tongue adapted to be received in said grooved rib whereby to connect the sections, said tongue and said rib having spaced ends, and a locking device associated with said spaced ends and consisting of an eccentric rib adapted to engage the ends of said tongue.

2. A demountable rim divided longitudinally to form annular sections, one section being endless and having a tongue element at its inner edge, the other section being split diagonally, and having a grooved element at its inner edge and adapted to receive said tongue element, said tongue element having an undercut passage therethrough, and a wedge latch adapted to be seated within said undercut passage, to lock the said sections together.

3. A demountable rim consisting of separable annular sections adapted to abut laterally at their inner edges, one of said sections provided with an inwardly projecting flange at its inner edge and said flange having cut out portions, the opposite walls of said cut out portions being undercut, the other section having an inwardly projecting grooved rib at its inner edge, the groove opening outwardly, said rib having also a transverse cut out portion complementary to the cut out portion of the flange of the other member, and a wedging latch element engaging an undercut end of the flange, whereby said sections are securely locked together and also against relative circumferential movement on a wheel.

4. A demountable rim comprising a pair of annular sections adapted to abut laterally at their inner edges, one section provided at its inner edge with an inwardly extending tongue having a portion cut out thereof, the walls of said cut out portion being undercut, and the base of said section having an open slot in its inner edge between the undercut ends of the tongue, the other section having an inwardly extending grooved rib having a cut out portion to register with the cut out portion of the tongue, and a cam wedging latch member adapted to be seated within the matching cut out portion of the tongue and grooved rib and engaging the undercut walls of the ends of the tongue.

5. A rim comprising a pair of annular sections, one of which is continuous and the other being split, one section being provided at its outer edge with a laterally projecting grooved rib and the other being provided with an inwardly directed tongue adapted to be received in said grooved rib whereby to connect the sections, said tongue and said rib having spaced ends, and a locking device associated with said spaced ends and consisting of an attaching sleeve and an eccentric rib adapted to be wedged between the ends of the tongue, said attaching sleeve being adapted for the reception of a valve stem.

6. A rim comprising a pair of annular sections, one of which is continuous and the other being split, one section being provided at its outer edge with a laterally projecting grooved rib and the other being provided with an inwardly directed tongue adapted to be received in said grooved rib whereby to connect the sections, said tongue and said rib having spaced ends, and a locking device associated with said spaced ends and consisting of an attaching sleeve and an eccentric rib adapted to be wedged between the ends of the tongue, said attaching sleeve being adapted for the reception of a valve stem, said attaching sleeve being adapted to be received in the felloe of the wheel.

7. A rim comprising a pair of annular sections, one of which is continuous and the other being split, one section being provided at its outer edge with a laterally projecting grooved rib and the other being provided with an inwardly directed tongue adapted to be received in said grooved rib whereby to connect the sections, said tongue having its ends arranged in spaced relation and being undercut, and a locking device having an eccentric rib adapted to be engaged with the undercut ends of said tongue, said locking device also being provided with a valve stem receiving attaching sleeve adapted to be engaged with the felloe of the wheel.

8. A latch for locking the sections of a demountable rim against relative circumferential and radial movement and against relative movement of the rim assembly with respect to a felly band, one of said sections having a tire stem receiving slot, said latch including a sleeve adapted to receive the valve stem, an eccentric rib surrounding the sleeve intermediate its ends, one face of said rib having a wedging cam surface.

JOHN TANNEHILL LANDIS.
ROBERT EDWARD LANDIS.